United States Patent
Chai et al.

(10) Patent No.: US 10,278,101 B2
(45) Date of Patent: Apr. 30, 2019

(54) CELL DISCOVERY METHOD AND APPARATUS

(71) Applicant: Huawei Technologies Co., Ltd., Shenzhen, Guangdong (CN)

(72) Inventors: Li Chai, Beijing (CN); Bo Lin, Beijing (CN); Yan Wang, Beijing (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 14/968,383

(22) Filed: Dec. 14, 2015

(65) Prior Publication Data
US 2016/0100343 A1    Apr. 7, 2016

Related U.S. Application Data

(63) Continuation of application No. PCT/CN2013/077229, filed on Jun. 14, 2013.

(51) Int. Cl.
   *H04W 36/08*    (2009.01)
   *H04W 36/00*    (2009.01)
   (Continued)

(52) U.S. Cl.
   CPC ....... *H04W 36/08* (2013.01); *H04W 36/0088* (2013.01); *H04W 48/16* (2013.01);
   (Continued)

(58) Field of Classification Search
   None
   See application file for complete search history.

(56) References Cited

U.S. PATENT DOCUMENTS 9,179,369 B2 *  11/2015  Chun .................... H04W 36/04
2009/0097452 A1  4/2009  Gogic
(Continued)

FOREIGN PATENT DOCUMENTS

CN    1285094 A    2/2001
CN    101222251 A  7/2008
(Continued)

OTHER PUBLICATIONS

"Discussion of small cell synchronization methods", Alcatel-Lucent, 3GPP TSG-RAN1 Meeting #73, May 20-24, 2013, 3 pages, R1-132061.

(Continued)

*Primary Examiner* — Saba Tsegaye

(57) ABSTRACT

Embodiments of the present invention provide a cell discovery method and apparatus, where the method includes: determining, by a second network node, modified timing of the second network node according to acquired timing modification information; receiving, by the second network node, uplink resource information of user equipment sent by a first network node; performing, by the second network node, detection on an uplink signal of the user equipment by using the modified timing and according to the uplink resource information; and when detecting proximity of the user equipment, sending, by the second network node, proximity information to the first network node. The cell discovery method and apparatus provided in the embodiments of the present invention prevent from triggering UE to perform unnecessary cell measurement or handover, thereby reducing network signaling load and lowering power consumption of the UE.

20 Claims, 8 Drawing Sheets

(51) Int. Cl.
*H04W 56/00* (2009.01)
*H04W 48/16* (2009.01)

(52) U.S. Cl.
CPC ......... *H04W 56/00* (2013.01); *H04W 56/001* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/21* (2018.01)

(56) References Cited

U.S. PATENT DOCUMENTS

| | | | | |
|---|---|---|---|---|
| 2012/0157105 A1* | 6/2012 | Grob-Lipski | ......... | H04W 36/32 455/437 |
| 2013/0115944 A1* | 5/2013 | Tavildar | ............... | H04W 48/12 455/434 |
| 2014/0098753 A1* | 4/2014 | Kazmi | ................. | H04L 5/0091 370/329 |
| 2014/0235246 A1 | 8/2014 | Lin et al. | | |
| 2015/0195774 A1* | 7/2015 | Lee | .................. | H04W 72/1226 370/312 |
| 2015/0215879 A1* | 7/2015 | Zhu | .................... | H04W 56/001 370/350 |

FOREIGN PATENT DOCUMENTS

| | | |
|---|---|---|
| CN | 101855845 A | 10/2010 |
| CN | 102856901 A | 1/2013 |
| CN | 103037394 A | 4/2013 |
| EP | 2 753 127 A1 | 7/2014 |
| WO | 99/33196 A1 | 7/1999 |
| WO | WO 2013/050004 A1 | 4/2013 |

OTHER PUBLICATIONS

"Small Cell Discovery in HetNet", Huawei, 3GPP TSG RAN WG2 Meeting #75bis, Oct. 10-14, 2011, 4 pages, R2-115169.

"3rd Generation Partnership Project; Technical Specification Group Radio Access Network; Evolved Universal Terrestrial Radio Access Network (E-UTRAN); S1 Application Protocol (S1AP)(Release 11)", 3GPP TS 36.413 V11.3.0, Mar. 2013, 274 pages.

* cited by examiner

CELL DISCOVERY METHOD AND APPARATUS

CROSS-REFERENCE TO RELATED APPLICATIONS

This application is a continuation of International Application No. PCT/CN2013/077229, filed on Jun. 14, 2013, which is hereby incorporated by reference in its entirety.

TECHNICAL FIELD

The present invention relates to communications technologies, and in particular, to a cell discovery method and apparatus.

BACKGROUND

To satisfy or enhance performance of a wireless communications system, base stations of different types or different standards are deployed in a homogeneous network, so that coverage areas of a base station or a transmit/receive node with a low transmit power, for example, a micro base station (Micro BS), a pico base station (Pico BS), a femto base station (Femto BS), a home base station (Home BS), a relay base station (Relay BS), a radio remote head (RRH) and wireless fidelity (Wi-Fi) hotspot cell, a long term evolution high-fidelity (LTE HIFI) cell, and user equipment (UE) in direct device-to-device (D2D) communication are included, so as to enhance coverage and performance of the network. Such a network structure is called a heterogeneous network.

To improve efficiency of performing cell search and measurement by UE, in the prior art, a pico cell listens to whether UE of a macro cell is in proximity, and when detecting that the UE of the macro cell is in proximity, the pico cell notifies the macro cell of proximity information, so that the macro cell instructs the UE of the macro cell to perform signal measurement on a frequency of the pico cell or the pico cell, and when a condition is satisfied, and the macro cell is triggered to hand over the UE of the macro cell to the pico cell, thereby improving, by performing purposeful search and measurement in a small range, the efficiency of cell search and measurement.

In the prior art, a large quantity of unnecessary UEs of macro cells are triggered to perform signal measurement on a frequency of a pico cell, which increases network signaling load and increases power consumption of UEs.

SUMMARY

Embodiments of the present invention provide a cell discovery method and apparatus, to prevent from triggering UE to perform unnecessary cell measurement or handover.

According to a first aspect, an embodiment of the present invention provides a cell discovery method, where the method includes:

determining, by a second network node, modified timing of the second network node according to acquired timing modification information;

receiving, by the second network node, uplink resource information of user equipment sent by a first network node;

performing, by the second network node, detection on an uplink signal of the user equipment by using the modified timing and according to the uplink resource information; and when detecting proximity of the user equipment, sending, by the second network node, proximity information to the first network node.

In a first possible implementation manner of the first aspect, before the determining, by a second network node, modified timing of the second network node according to acquired timing modification information, the method further includes:

receiving, by the second network node, the timing modification information sent by the first network node or a network administration and maintenance entity.

According to the first possible implementation manner of the first aspect, in a second possible implementation manner, the timing modification information includes: a distance value between the second network node and the first network node; and the determining, by a second network node, modified timing of the second network node according to acquired timing modification information includes:

determining, by the second network node according to the distance value, a timing advance of a position, in the second network node, of the user equipment served by the first network node; and determining, by the second network node, the modified timing according to timing of the first network node and the timing advance.

According to the first possible implementation manner of the first aspect, in a third possible implementation manner, the timing modification information includes: a timing advance of at least one user equipment handed over from the first network node to the second network node; and the determining, by a second network node, modified timing of the second network node according to acquired timing modification info illation includes:

determining, by the second network node according to the timing advance, a timing advance of a position, in the second network node, of the user equipment served by the first network node; and determining, by the second network node, the modified timing according to timing of the first network node and the determined timing advance.

According to the third possible implementation manner of the first aspect, in a fourth possible implementation manner, the determining, by the second network node according to the timing advance, a timing advance of a position, in the second network node, of the user equipment served by the first network node includes:

using, by the second network node, a maximum value of the timing advance as the timing advance of the position, in the second network node, of the user equipment served by the first network node; or using, by the second network node, an average value of the timing advance as the timing advance of the position, in the second network node, of the user equipment served by the first network node.

According to the first possible implementation manner of the first aspect, in a fifth possible implementation manner, the timing modification information includes: a timing advance of a position, in the second network node, of the user equipment served by the first network node; and the determining, by a second network node, modified timing of the second network node according to acquired timing modification information includes:

determining, by the second network node, the modified timing according to timing of the first network node and the timing advance of the position, in the second network node, of the user equipment served by the first network node.

According to any one of the second to the fifth possible implementation manners of the first aspect, in a sixth possible implementation manner, before the determining, by a second network node, modified timing of the second network node according to acquired timing modification information, the method further includes:

receiving, by the second network node, the timing of the first network node sent by the first network node.

According to the first possible implementation manner of the first aspect, in a seventh possible implementation manner, the timing modification information includes: timing of the second network node; and the determining, by a second network node, modified timing of the second network node according to acquired timing modification information includes:

using, by the second network node, received timing of the second network node as the modified timing.

According to any one of the first to the seventh possible implementation manners of the first aspect, in an eighth possible implementation manner, before the receiving, by the second network node, the timing modification information sent by the first network node or a network administration and maintenance entity, the method further includes:

sending, by the second network node, a timing modification request message to the first network node or the network administration and maintenance entity;

and/or, before the receiving, by the second network node, uplink resource information of user equipment sent by a first network node, the method further includes:

sending, by the second network node, an acquisition request message for the uplink resource information of the user equipment to the first network node.

According to any one of the first aspect and the first to the eighth possible implementation manners of the first aspect, in a ninth possible implementation manner, the uplink resource information includes: a transmit power value of the user equipment; and the sending, by the second network node, proximity information to the first network node includes:

when the second network node detects the uplink signal of the user equipment, and detects that a difference between the transmit power value of the user equipment and a power value of the uplink signal is less than a preset threshold, sending, by the second network node, the proximity information to the first network node.

According to any one of the first aspect and the first to the ninth possible implementation manners of the first aspect, in a tenth possible implementation manner, the uplink resource information is information about an uplink resource reserved by the first network node for the user equipment, and at least one feature of the uplink resource is static or semi-static.

According to any one of the first aspect and the first to the tenth possible implementation manners of the first aspect, in an eleventh possible implementation manner, the proximity information includes a user identifier of the user equipment or resource information used by the user equipment.

According to a second aspect, an embodiment of the present invention provides a cell discovery method, where the method includes:

sending, by a first network node, timing modification information to a second network node, where the timing modification information is used by the second network node to determine modified timing of the second network node according to the timing modification information;

sending, by the first network node, uplink resource information of user equipment to the second network node;

receiving, by the first network node, proximity information sent by the second network node, where the proximity information is obtained, by the second network node by performing detection on an uplink signal of the user equipment by using the modified timing and according to the uplink resource information, when the second network node detects proximity of the user equipment; and instructing, by the first network node according to the proximity information, the user equipment in proximity to the second network node to perform measurement or handover.

In a first possible implementation manner of the second aspect, the timing modification information includes at least one of the following information:

a distance value between the second network node and the first network node;

a timing advance of at least one user equipment handed over from the first network node to the second network node;

a timing advance of a position, in the second network node, of the user equipment served by the first network node; and timing of the second network node.

According to the second aspect or the first possible implementation manner of the second aspect, in a second possible implementation manner, before the sending, by a first network node, timing modification information to a second network node, the method further includes:

receiving, by the first network node, a timing modification request message sent by the second network node;

and/or, before the sending, by the first network node, uplink resource information of user equipment to the second network node, the method further includes:

receiving, by the first network node, an acquisition request message, sent by the second network node, for the uplink resource information of the user equipment.

According to any one of the second aspect and the first and the second possible implementation manners of the second aspect, in a third possible implementation manner, the uplink resource information includes: a transmit power value of the user equipment.

According to any one of the second aspect and the first to the third possible implementation manners of the second aspect, in a fourth possible implementation manner, the uplink resource information is information about an uplink resource reserved by the first network node for the user equipment, and at least one feature of the uplink resource is static or semi-static.

According to any one of the second aspect and the first to the fourth possible implementation manners of the second aspect, in a fifth possible implementation manner, the proximity information includes a user identifier of the user equipment or resource information used by the user equipment.

According to a third aspect, an embodiment of the present invention provides a second network node, where the apparatus includes:

a determining module, configured to determine modified timing of the second network node according to acquired timing modification information;

a receiving module, configured to receive uplink resource information of user equipment sent by a first network node;

a detection module, configured to perform detection on an uplink signal of the user equipment by using the modified timing determined by the determining module and according to the uplink resource information received by the receiving module; and a sending module, configured to: when the detection module detects proximity of the user equipment, send proximity information to the first network node.

In a first possible implementation manner of the third aspect, the receiving module is configured to: before the determining module determines the modified timing of the second network node according to the acquired timing modification information, receive the timing modification information sent by the first network node or a network administration and maintenance entity.

According to the first possible implementation manner of the third aspect, in a second possible implementation manner, the timing modification information includes: a distance value between the second network node and the first network node; and the determining module is specifically configured to determine, according to the distance value, a timing advance of a position, in the second network node, of the user equipment served by the first network node; and determine the modified timing according to timing of the first network node and the timing advance.

According to the first possible implementation manner of the third aspect, in a third possible implementation manner, the timing modification information includes: a timing advance of at least one user equipment handed over from the first network node to the second network node; and the determining module is specifically configured to determine, according to the timing advance, a timing advance of a position, in the second network node, of the user equipment served by the first network node; and determine the modified timing according to timing of the first network node and the determined timing advance.

According to the third possible implementation manner of the third aspect, in a fourth possible implementation manner, the determining module is specifically configured to use a maximum value of the timing advance as the timing advance of the position, in the second network node, of the user equipment served by the first network node; or, use an average value of the timing advance as the timing advance of the position, in the second network node, of the user equipment served by the first network node.

According to the first possible implementation manner of the third aspect, in a fifth possible implementation manner, the timing modification information includes: a timing advance of a position, in the second network node, of the user equipment served by the first network node; and the determining module is specifically configured to determine the modified timing according to timing of the first network node and the timing advance of the position, in the second network node, of the user equipment served by the first network node.

According to any one of the second to the fifth possible implementation manners of the third aspect, in a sixth possible implementation manner, the receiving module is further configured to: before the determining module determines the modified timing of the second network node according to the acquired timing modification information, receive the timing of the first network node sent by the first network node.

According to the first possible implementation manner of the third aspect, in a seventh possible implementation manner, the timing modification information includes: timing of the second network node; and the determining module is specifically configured to use received timing of the second network node as the modified timing.

According to any one of the first to the seventh possible implementation manners of the third aspect, in an eighth possible implementation manner, the sending module is further configured to: before the receiving module receives the timing modification information sent by the first network node or the network administration and maintenance entity, send a timing modification request message to the first network node or the network administration and maintenance entity;

and/or, the sending module is further configured to: before the receiving module receives the uplink resource information of the user equipment sent by the first network node, send an acquisition request message for the uplink resource information of the user equipment to the first network node.

According to any one of the third aspect and the first to the eighth possible implementation manners of the third aspect, in a ninth possible implementation manner, the uplink resource information includes: a transmit power value of the user equipment; and the sending module is specifically configured to: when the detection module detects the uplink signal of the user equipment, and detects that a difference between the transmit power value of the user equipment and a power value of the uplink signal is less than a preset threshold, send the proximity information to the first network node.

According to any one of the third aspect and the first to the ninth possible implementation manners of the third aspect, in a tenth possible implementation manner, the uplink resource information is information about an uplink resource reserved by the first network node for the user equipment, and at least one feature of the uplink resource is static or semi-static.

According to any one of the third aspect and the first to the tenth possible implementation manners of the third aspect, in an eleventh possible implementation manner, the proximity information includes a user identifier of the user equipment or resource information used by the user equipment.

According to a fourth aspect, an embodiment of the present invention provides a first network node, where the apparatus includes:

a sending module, configured to send timing modification information to a second network node, where the timing modification information is used by the second network node to determine modified timing of the second network node according to the timing modification information;

where the sending module is further configured to send uplink resource information of user equipment to the second network node;

a receiving module, configured to receive proximity information sent by the second network node, where the proximity information is obtained, by the second network node by performing detection on an uplink signal of the user equipment by using the modified timing and according to the uplink resource information, when the second network node detects proximity of the user equipment; and a processing module, configured to instruct, according to the proximity information sent by the second network node and received by the receiving module, the user equipment in proximity to the second network node to perform measurement or handover.

In a first possible implementation manner of the fourth aspect, the timing modification information includes at least one of the following information:

a distance value between the second network node and the first network node;

a timing advance of at least one user equipment handed over from the first network node to the second network node;

a timing advance of a position, in the second network node, of the user equipment served by the first network node; and timing of the second network node.

According to the fourth aspect or the first possible implementation manner of the fourth aspect, in a second possible implementation manner, the receiving module is further configured to: before the sending module sends the timing modification information to the second network node, receive a timing modification request message sent by the second network node;

and/or, the receiving module is further configured to: before the sending module sends the uplink resource information of the user equipment to the second network node, receive an acquisition request message, sent by the second network node, for the uplink resource information of the user equipment.

According to any one of the fourth aspect and the first and the second possible implementation manners of the fourth aspect, in a third possible implementation manner, the uplink resource information includes: a transmit power value of the user equipment.

According to any one of the fourth aspect and the first to the third possible implementation manners of the fourth aspect, in a fourth possible implementation manner, the uplink resource information is information about an uplink resource reserved by the first network node for the user equipment, and at least one feature of the uplink resource is static or semi-static.

According to any one of the fourth aspect and the first to the fourth possible implementation manners of the fourth aspect, in a fifth possible implementation manner, the proximity information includes a user identifier of the user equipment or resource information used by the user equipment.

According to a fifth aspect, an embodiment of the present invention provides a second network node, where the apparatus includes:

a processor, configured to determine modified timing of the second network node according to acquired timing modification information;

a receiver, configured to receive uplink resource information of user equipment sent by a first network node;

where the processor is further configured to perform detection on an uplink signal of the user equipment by using the modified timing and according to the uplink resource information received by the receiver; and a sender, configured to: when the processor detects proximity of the user equipment, send proximity information to the first network node.

In a first possible implementation manner of the fifth aspect, the receiver is further configured to: before the processor determines the modified timing of the second network node according to the acquired timing modification information, receive the timing modification information sent by the first network node or a network administration and maintenance entity.

According to the first possible implementation manner of the fifth aspect, in a second possible implementation manner, the timing modification information includes: a distance value between the second network node and the first network node; and the processor is specifically configured to determine, according to the distance value, a timing advance of a position, in the second network node, of the user equipment served by the first network node; and determine the modified timing according to timing of the first network node and the timing advance.

According to the first possible implementation manner of the fifth aspect, in a third possible implementation manner, the timing modification information includes: a timing advance of at least one user equipment handed over from the first network node to the second network node; and the processor is specifically configured to determine, according to the timing advance, a timing advance of a position, in the second network node, of the user equipment served by the first network node; and determine the modified timing according to timing of the first network node and the determined timing advance.

According to the third possible implementation manner of the fifth aspect, in a fourth possible implementation manner, the processor is specifically configured to use a maximum value of the timing advance as the timing advance of the position, in the second network node, of the user equipment served by the first network node; or, use an average value of the timing advance as the timing advance of the position, in the second network node, of the user equipment served by the first network node.

According to the first possible implementation manner of the fifth aspect, in a fifth possible implementation manner, the timing modification information includes: a timing advance of a position, in the second network node, of the user equipment served by the first network node; and the processor is specifically configured to determine the modified timing according to timing of the first network node and the timing advance of the position, in the second network node, of the user equipment served by the first network node.

According to any one of the second to the fifth possible implementation manners of the fifth aspect, in a sixth possible implementation manner, the receiver is further configured to: before the processor determines the modified timing of the second network node according to the acquired timing modification information, receive the timing of the first network node sent by the first network node.

According to the first possible implementation manner of the fifth aspect, in a seventh possible implementation manner, the timing modification information includes: timing of the second network node; and the processor is specifically configured to use received timing of the second network node as the modified timing.

According to any one of the first to the seventh possible implementation manners of the fifth aspect, in an eighth possible implementation manner, the sender is further configured to: before the receiver receives the timing modification information sent by the first network node or the network administration and maintenance entity, send a timing modification request message to the first network node or the network administration and maintenance entity;

and/or, the sender is further configured to: before the receiver receives the uplink resource information of the user equipment sent by the first network node, send an acquisition request message for the uplink resource information of the user equipment to the first network node.

According to any one of the fifth aspect and the first to the eighth possible implementation manners of the fifth aspect, in a ninth possible implementation manner, the uplink resource information includes: a transmit power value of the user equipment; and the sender is specifically configured to: when the processor detects the uplink signal of the user equipment, and detects that a difference between the transmit power value of the user equipment and a power value of the uplink signal is less than a preset threshold, send the proximity information to the first network node.

According to any one of the fifth aspect and the first to the ninth possible implementation manners of the fifth aspect, in a tenth possible implementation manner, the uplink resource information is information about an uplink resource reserved by the first network node for the user equipment, and at least one feature of the uplink resource is static or semi-static.

According to any one of the fifth aspect and the first to the tenth possible implementation manners of the fifth aspect, in an eleventh possible implementation manner, the proximity information includes a user identifier of the user equipment or resource information used by the user equipment.

According to a sixth aspect, an embodiment of the present invention provides a first network node, where the apparatus includes:

a sender, configured to send timing modification information to a second network node, where the timing modification information is used by the second network node to determine modified timing of the second network node according to the timing modification information;

where the sender is further configured to send uplink resource information of user equipment to the second network node;

a receiver, configured to receive proximity information sent by the second network node, where the proximity information is obtained, by the second network node by performing detection on an uplink signal of the user equipment by using the modified timing and according to the uplink resource information, when the second network node detects proximity of the user equipment; and a processor, configured to instruct, according to the proximity information sent by the second network node and received by the receiver, the user equipment in proximity to the second network node to perform measurement or handover.

In a first possible implementation manner of the sixth aspect, the timing modification information includes at least one of the following information:

a distance value between the second network node and the first network node;

a timing advance of at least one user equipment handed over from the first network node to the second network node;

a timing advance of a position, in the second network node, of the user equipment served by the first network node; and timing of the second network node.

According to the sixth aspect or the first possible implementation manner of the sixth aspect, in a second possible implementation manner, the receiver is further configured to: before the sender sends the timing modification information to the second network node, receive a timing modification request message sent by the second network node; and/or, the receiver is further configured to: before the sender sends the uplink resource information of the user equipment to the second network node, receive an acquisition request message, sent by the second network node, for the uplink resource information of the user equipment.

According to any one of the sixth aspect and the first and the second possible implementation manners of the sixth aspect, in a third possible implementation manner, the uplink resource information includes: a transmit power value of the user equipment.

According to any one of the sixth aspect and the first to the third possible implementation manners of the sixth aspect, in a fourth possible implementation manner, the uplink resource information is information about an uplink resource reserved by the first network node for the user equipment, and at least one feature of the uplink resource is static or semi-static.

According to any one of the sixth aspect and the first to the fourth possible implementation manners of the sixth aspect, in a fifth possible implementation manner, the proximity information includes a user identifier of the user equipment or resource information used by the user equipment.

By means of the cell discovery method and apparatus provided in the embodiments of the present invention, timing of a second network node is first modified according to timing modification information, and a synchronization relationship based on the timing modification information is established between the timing of the second network node and timing of a first network node. The second network node can detect UE served by the first network node only when the UE is in proximity to the second network node, and send proximity information to the first network node. However, an uplink signal sent by UE outside a coverage area of the second network node is not within a detection range of the second network node, and therefore the second network node is prevented from incorrectly determining that the UE outside the coverage area of the second network node is UE in proximity to the second network node and triggering, by sending the proximity information, the first network node to instruct the UE to perform unnecessary measurement or handover, thereby reducing network signaling load and lowering power consumption of the UE.

DETAILED DESCRIPTION

Figure 1:
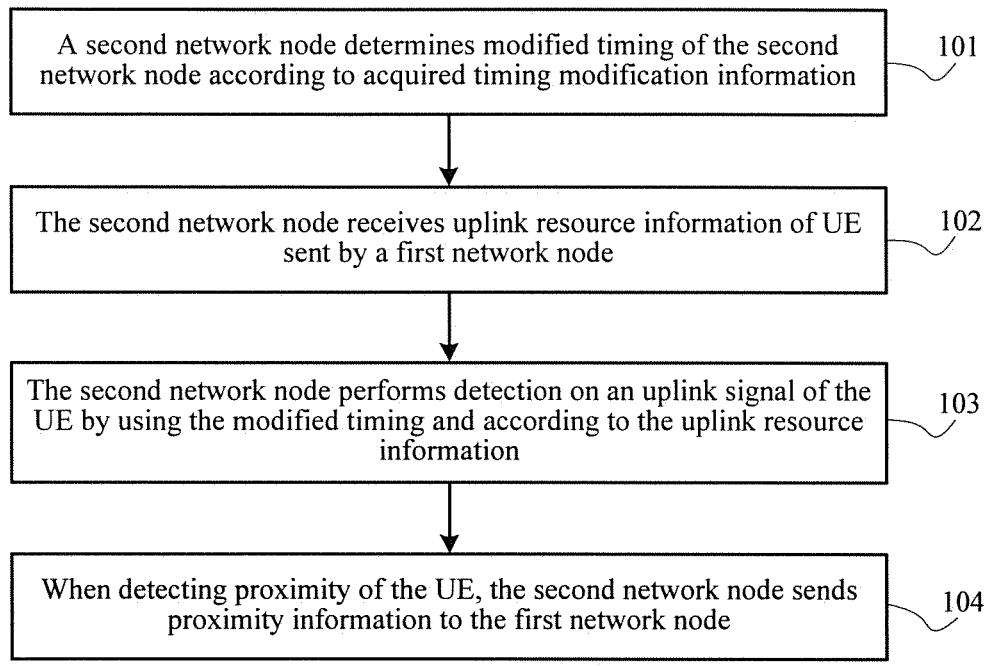
FIG. 1 is a flowchart of Embodiment 1 of a cell discovery method according to the present invention.

FIG. 1 is a flowchart of Embodiment 1 of a cell discovery method according to the present invention. The method in this embodiment is applicable to that a network node in a wireless communications system detects whether user equipment of another network node enters a coverage area of the current network node, where for example, the wireless communications system may be a universal mobile telecommunications system (Universal Mobile Telecommunications System, UMTS for short), Long Term Evolution (Long Term Evolution, LTE for short), Long Term Evolution Advanced (LTE-Advanced, LTE-A for short) or the like. In the wireless communications system, network nodes of different types or different standards may be deployed. For example, a network node may be a base station with a high transmit power, for example, a macro base station, or may be a base station or a transmit/receive node with a low transmit power, for example, a Micro BS, a Pico BS, a Femto BS, a Home BS, a Relay BS, an RRH, a Wi-Fi hotspot cell, an LTE HIFI cell, UE in D2D, and different network nodes may work at a same frequency, or may work at different frequencies. An execution body of this embodiment is a second network node. As shown in FIG. 1, the method in this embodiment includes:

101: A second network node determines modified timing of the second network node according to acquired timing modification information.

102: The second network node receives uplink resource information of UE sent by a first network node.

103: The second network node performs detection on an uplink signal of the UE by using the modified timing and according to the uplink resource information.

104: When detecting proximity of the user equipment, the second network node sends proximity information to the first network node.

Specifically, the second network node and the first network node may be network nodes of a same type and a same standard, or may be two network nodes of different types or different standards. The second network node and the first network node are connected by using an X2, IUR, S1, or IU interface or a wireless air interface, for example, an interface between a microwave base station or a donor base station and a relay node. For example, the timing modification information may be transmission delay information between the first network node and the second network node. Steps 101 and 102 are not performed in a fixed order, and the acquisition may be performed separately or may be performed together.

Figure 2:
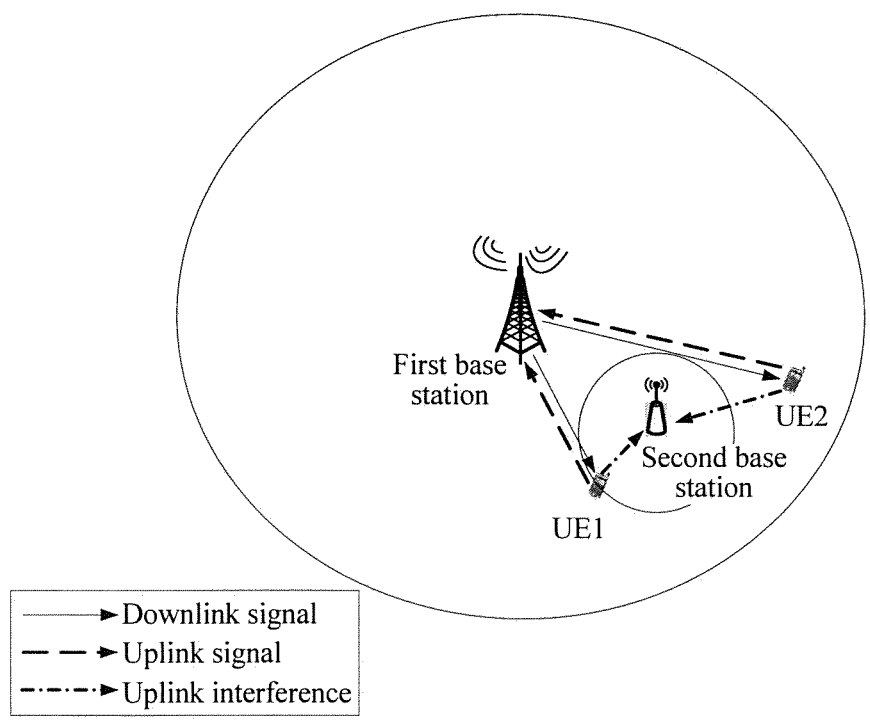
FIG. 2 is a diagram of an implementation principle of an existing cell discovery method.

FIG. 2 is a diagram of an implementation principle of an existing cell discovery method. As shown in FIG. 2, a first base station and a second base station are deployed in an inter-frequency manner, where a frequency of the first base station is f2, and a frequency of the second base station is f1, a receiver is set on the second base station, so that the second base station has an uplink receiving function for receiving an uplink signal of the frequency f2 of the first base station, and an intersection exists between a coverage area of the second base station and a coverage area of the first base station. The second base station performs detection on an uplink signal sent by UE served by the first base station, so as to detect whether the UE served by the first base station is in proximity. The proximity refers to that the UE served by the first base station enters a signal coverage area of the second base station, or the UE served by the first base station is in proximity to the coverage area of the second base station. A rule of determining, by the second base station, whether the UE served by the first base station is in proximity to the second base station is: The second base station can receive the uplink signal sent by the UE served by the first base station, and a receive power value of the uplink signal is greater than a preset threshold. When detecting that UE1 served by the first base station is in proximity to the second base station, the second base station notifies the first base station of proximity information, so that the first base station instructs UE1 to perform signal measurement on a frequency of the second base station or a cell of the second base station, and when a condition is satisfied, the first base station is triggered to hand over UE1 to the cell of the second base station. Alternatively, when detecting that UE1 served by the first base station is in proximity to the second base station, the second base station notifies the first base station of proximity information, so that the first base station hands over UE1 to a cell of the second base station. For UE2 served by the first base station, UE2 is located outside the coverage area of the second base station. UE2 is located at an edge of coverage of the first base station, and therefore, to compensate for a path loss of a radio channel, an uplink transmit power of UE2 may be probably higher than that of UE1. Therefore, even if UE2 is not located in the coverage area of the second base station, the second base station may still receive an uplink signal sent by UE2. In this case, according to a determining rule in the prior art, the second base station incorrectly determines that UE2 is in proximity to the second base station, and notifies the first base station of proximity information, and further, the first base station instructs UE2 to perform signal measurement on the frequency of the second base station or on the second base station. In fact, UE2 is not in the coverage area of the second base station; therefore, it is useless for UE2 to perform signal measurement on the frequency of the second base station or the second base station, which unnecessarily increases network signaling load and causes unnecessary power consumption of UE2. Therefore, it is inaccurate to determine whether UE served by a first base station is in proximity to a second base station by only relying on assessment of that the second base station can receive an uplink signal sent by the UE served by the first base station and that a receive power value of the uplink signal is greater than a preset threshold.

However, by means of the cell discovery method provided in this embodiment of the present invention, as shown in FIG. 1, a second network node modifies timing of the second network node according to acquired timing modification information, determines modified timing of the second network node, and uses the modified timing. Therefore, a synchronization relationship based on the timing modification information is established between the modified timing of the second network node and timing of a first network node, so that when the second network node performs detection on an uplink signal of UE by using the modified timing and received uplink resource information of the UE sent by the first network node, the second network node can detect an uplink signal sent by UE served by the first network node only when the UE is in proximity to the second network node, that is, enters a coverage area of the second network node or is in proximity to the coverage area of the second network node. When detecting proximity of the user equipment, the second network node sends proximity information to the first network node, where the proximity information includes a user identifier of the UE or resource information used by the UE. However, an uplink signal sent by UE outside the coverage area of the second network node is not within a detection range of the second network node, and therefore the second network node is prevented from incorrectly determining that the UE outside the coverage area of the second network node is UE in proximity to the second network node and triggering, by sending the proximity information, the first network node to instruct the UE to perform unnecessary measurement or handover, thereby reducing network signaling load and lowering power consumption of the UE.

It should be noted that, the cell discovery method in this embodiment of the present invention is applicable not only to a scenario in which the first network node and the second network node are deployed in an intra-frequency manner, but also to a scenario in which the first network node and the second network node are deployed in an inter-frequency manner. For the scenario in which the first network node and the second network node are deployed in an inter-frequency manner, for example, a frequency of the first network node is f2, and a frequency of the second network node is f1, to make the second network node have an uplink receiving function for receiving an uplink signal of f2, a radio frequency module for the uplink frequency f2 may also be set on the second network node in this embodiment of the present invention.

The foregoing description about standards and types of a wireless communications system and a wireless access device is only exemplary, and application of technical solutions of the present invention is not limited to the foregoing situations.

In practice, the proximity information includes a user identifier of the UE or resource information used by the UE. The second network node may acquire the timing modification information from the first network node, or may acquire the timing modification information from a network administration and maintenance entity, for example, an operations, administration and maintenance (OAM) entity. That is, before the determining, by a second network node, modified timing of the second network node according to acquired timing modification information, the method further includes: receiving, by the second network node, the timing modification information sent by the first network node or the network administration and maintenance entity. Optionally, before receiving the timing modification information sent by the first network node, the second network node may first send a timing modification request message to the first network node, so that the first network node sends the timing modification information to the second network node. Optionally, before receiving uplink resource information of UE sent by a first network node, the second network node may first send an acquisition request message for the uplink resource information of the UE to the first network node, so that the first network node sends the uplink resource information of the UE served by the first network node to the second network node.

When the second network node sends the timing modification request message and the acquisition request message to the first network node, the timing modification request message and the acquisition request message may be separately sent, or may be sent by being carried in a same signaling message; during separate sending, there is no fixed order. The resource information includes at least one of time domain information, frequency domain information, space domain information, code domain information, and power control information. The time domain information may include, but is not limited to, at least one of a transmission interval, inter-cell synchronization information (for example, which may be a subframe offset value), subframe information, and timeslot information. The frequency domain information may include, but is not limited to, a position of a physical resource block. The space domain information may include, but is not limited to, beam information, stream information, and space coding matrix information. The code domain information may include, but is not limited to, address code, scrambling code, and sequence initialization code. For example, the uplink resource information of the UE served by the first network node may include resource information such as a cell radio network temporary identifier (C-RNTI) for demodulating uplink data, a physical cell identity (PCI), a virtual cell identifier or a demodulation reference signal (Demodulation RS) and/or a sounding reference signal (SRS) for uplink measurement and/or a random access preamble (RA Preamble), and a power control parameter.

Figure 3:
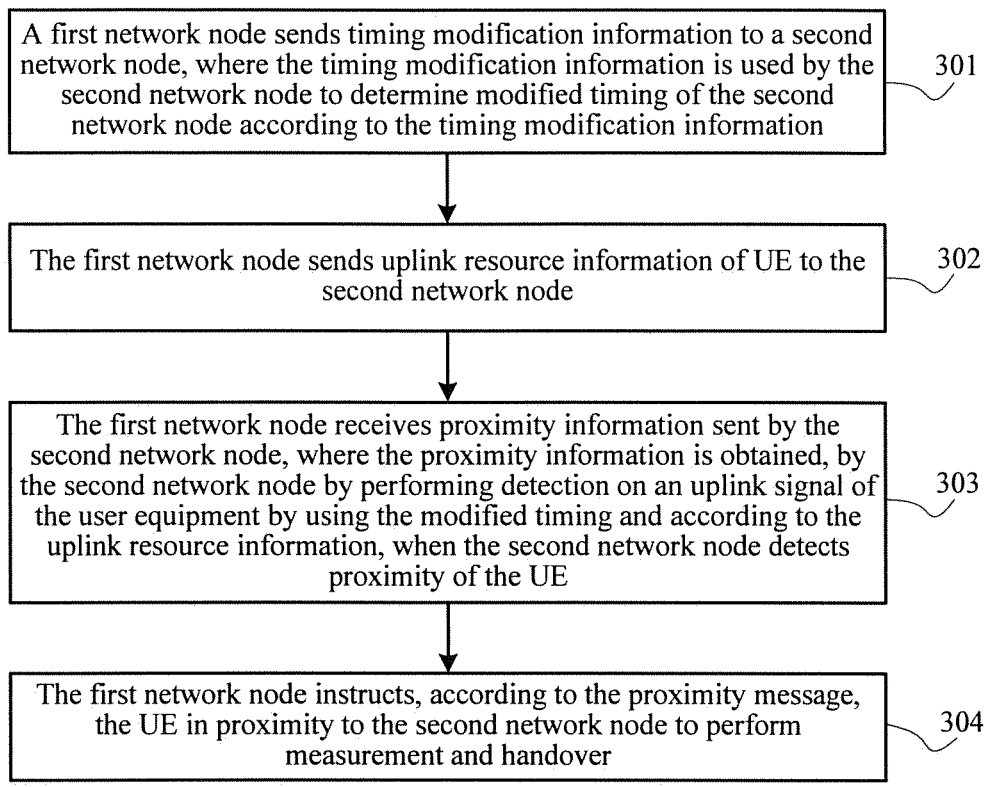
FIG. 3 is a flowchart of Embodiment 2 of a cell discovery method according to the present invention.

FIG. 3 is a flowchart of Embodiment 2 of a cell discovery method according to the present invention. An execution body of this embodiment is a first network node. As shown in FIG. 3, the method in this embodiment includes:

301: A first network node sends timing modification information to a second network node, where the timing modification information is used by the second network node to determine modified timing of the second network node according to the timing modification information.

302: The first network node sends uplink resource information of UE to the second network node.

303: The first network node receives proximity information sent by the second network node, where the proximity information is obtained, by the second network node by performing detection on an uplink signal of the user equipment by using the modified timing and according to the uplink resource information, when the second network node detects proximity of the user equipment.

304: The first network node instructs, according to the proximity information, the user equipment in proximity to the second network node to perform measurement or handover.

Specifically, steps 301 and 302 are not performed in a fixed order, and the sending may be performed separately or may be performed together. By means of the cell discovery method provided in this embodiment of the present invention, a first network node sends timing modification information to a second network node, so that the second network node modifies timing of the second network node according to the acquired timing modification information, and determines modified timing of the second network node; therefore, a synchronization relationship based on the timing modification information is established between the modified timing of the second network node and timing of a first network node, so that when the second network node performs detection on an uplink signal of UE by using the modified timing and received uplink resource information of the UE sent by the first network node, only when UE served by the first network node is in proximity to the second network node, that is, enters a coverage area of the second network node or is in proximity to the coverage area of the second network node, can the second network node detect the uplink signal sent by the UE; when detecting proximity of the user equipment, the second network node sends proximity information to the first network node. The first network node instructs, according to the proximity information, the UE to perform signal strength and/or signal quality measurement on a cell at a frequency of a cell of the second network node or only on the cell of the second network node, or the first network node directly hands over the UE to a cell of the second network node. However, an uplink signal sent by UE outside the coverage area of the second network node is not within a detection range of the second network node, and therefore the second network node is prevented from incorrectly determining that the UE outside the coverage area of the second network node is UE in proximity to the second network node and triggering, by sending the proximity information, the first network node to instruct the UE to perform unnecessary measurement or handover, thereby reducing network signaling load and lowering power consumption of the UE.

The following describes an interaction process between the first network node and the second network node in detail by using several specific embodiments.

Figure 4:
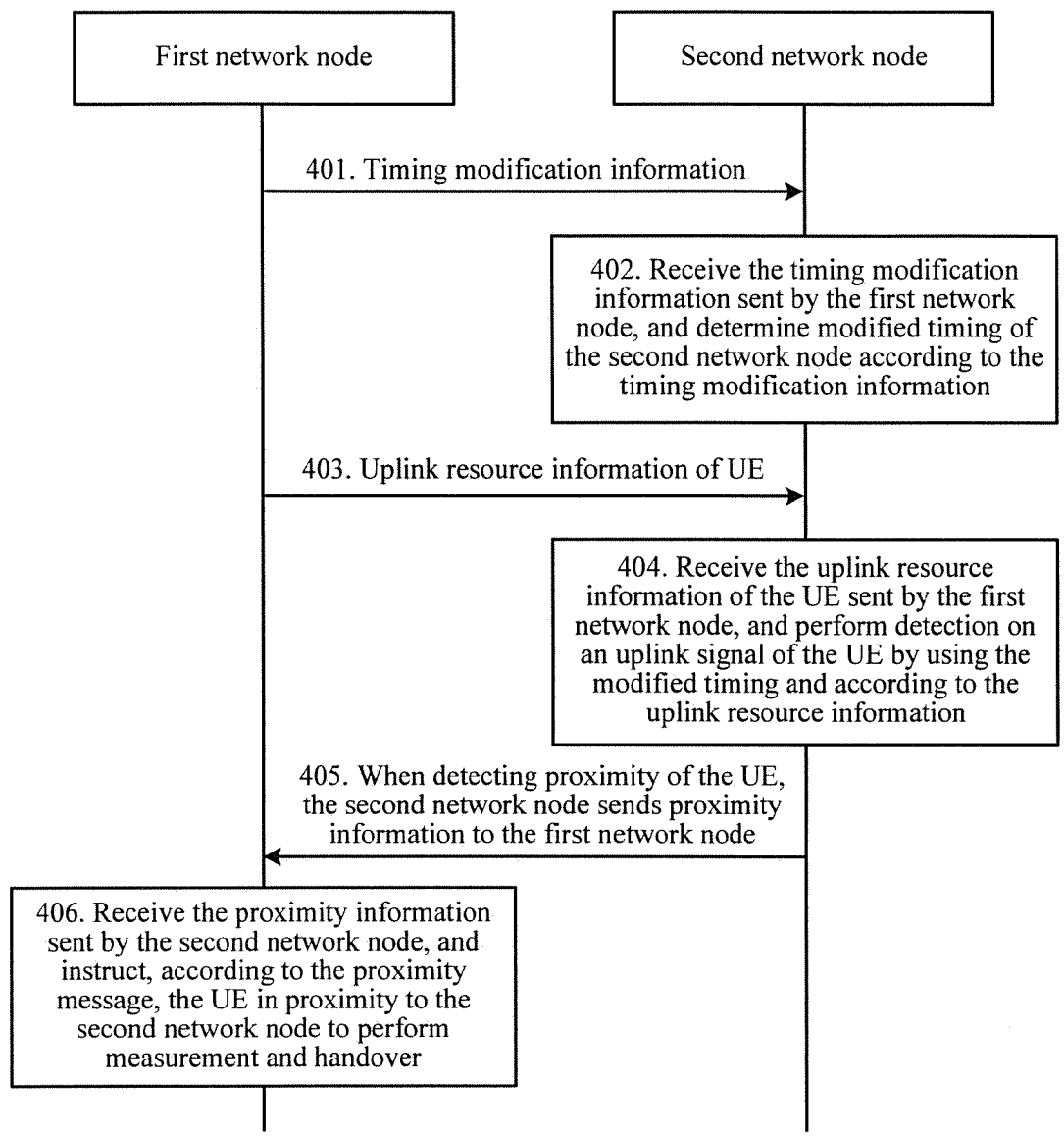
FIG. 4 is a signaling flowchart of Embodiment 3 of a cell discovery method according to the present invention.

FIG. 4 is a signaling flowchart of Embodiment 3 of a cell discovery method according to the present invention. This embodiment is implemented by a first network node and a second network node in a cooperative manner. As shown in FIG. 4, the cell discovery method provided in this embodiment includes:

401: A first network node sends timing modification information to a second network node.

402: The second network node receives the timing modification information sent by the first network node, and the second network node determines modified timing of the second network node according to the timing modification information.

403: The first network node sends uplink resource information of UE to the second network node.

404: The second network node receives the uplink resource information of the UE sent by the first network node, and the second network node performs detection on an uplink signal of the UE by using the modified timing and according to the uplink resource information.

405: When detecting proximity of the UE, the second network node sends proximity information to the first network node.

406: The first network node receives the proximity information sent by the second network node, and the first network node instructs, according to the proximity information, the UE in proximity to the second network node to perform measurement or handover.

By means of the cell discovery method provided in this embodiment of the present invention, timing of a second network node is modified by using acquired timing modification information, and a synchronization relationship based on the timing modification information is established between the timing of the second network node and timing of a first network node. The second network node can detect UE served by the first network node only when the UE is in proximity to the second network node, and send proximity information to the first network node, thereby preventing the UE from performing unnecessary cell measurement or handover, reducing network signaling load, and lowering power consumption of the UE.

Figure 5:
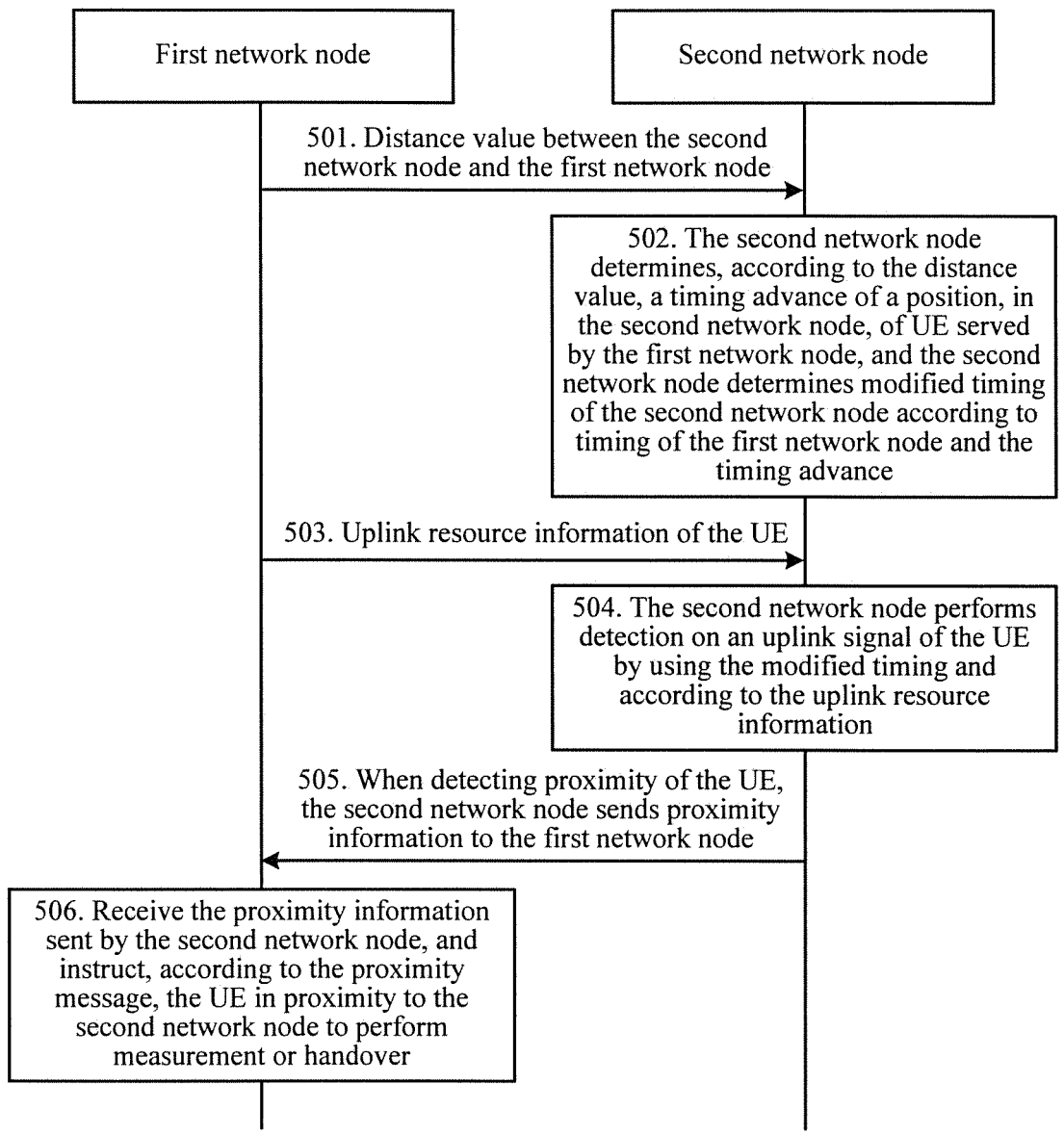
FIG. 5 is a signaling flowchart of Embodiment 4 of a cell discovery method according to the present invention.

FIG. 5 is a signaling flowchart of Embodiment 4 of a cell discovery method according to the present invention. This embodiment is implemented by a first network node and a second network node in a cooperative manner. As shown in FIG. 5, the cell discovery method provided in this embodiment includes:

501: A first network node sends a distance value between a second network node and the first network node to the second network node.

502: The second network node receives the distance value between the second network node and the first network node sent by the first network node, the second network node determines, according to the distance value, a timing advance (Timing Advance, TA for short) of a position, in the second network node, of UE served by the first network node, and the second network node determines modified timing of the second network node according to timing of the first network node and the timing advance.

Specifically, the position, in the second network node, of the UE served by the first network node refers to a position, within or near a coverage area of the second network node, of the UE served by the first network node is located.

503: The first network node sends uplink resource information of the UE to the second network node.

504: The second network node receives the uplink resource information of the UE sent by the first network node, and the second network node performs detection on an uplink signal of the UE by using the modified timing and according to the uplink resource information.

505: When detecting proximity of the UE, the second network node sends proximity information to the first network node.

506: The first network node receives the proximity information sent by the second network node, and the first network node instructs, according to the proximity information, the UE in proximity to the second network node to perform measurement or handover.

Specifically, after receiving the distance value between the second network node and the first network node sent by the first network node, the second network node calculates, according to the distance value, the timing advance of the position, in the second network node, of the UE served by the first network node, and then the second network node determines the modified timing of the second network node according to the timing of the first network node and the calculated timing advance. In practice, based on the distance value, the second network node may also calculate a cyclic prefix (Cyclic Prefix, CP for short) length value of the position, in the second network node, of the UE served by the first network node, and then the second network node determines the modified timing of the second network node according to the timing of the first network node and the calculated CP length value.

By means of the cell discovery method provided in this embodiment of the present invention, timing of a second network node is modified by using a distance value between the second network node and a first network node, and a synchronization relationship based on timing modification information is established between the timing of the second network node and timing of a first network node. The second network node can detect UE served by the first network node only when the UE is in proximity to the second network node, and send proximity information to the first network node, thereby preventing the UE from performing unnecessary cell measurement or handover, reducing network signaling load, and lowering power consumption of the UE.

Figure 6:
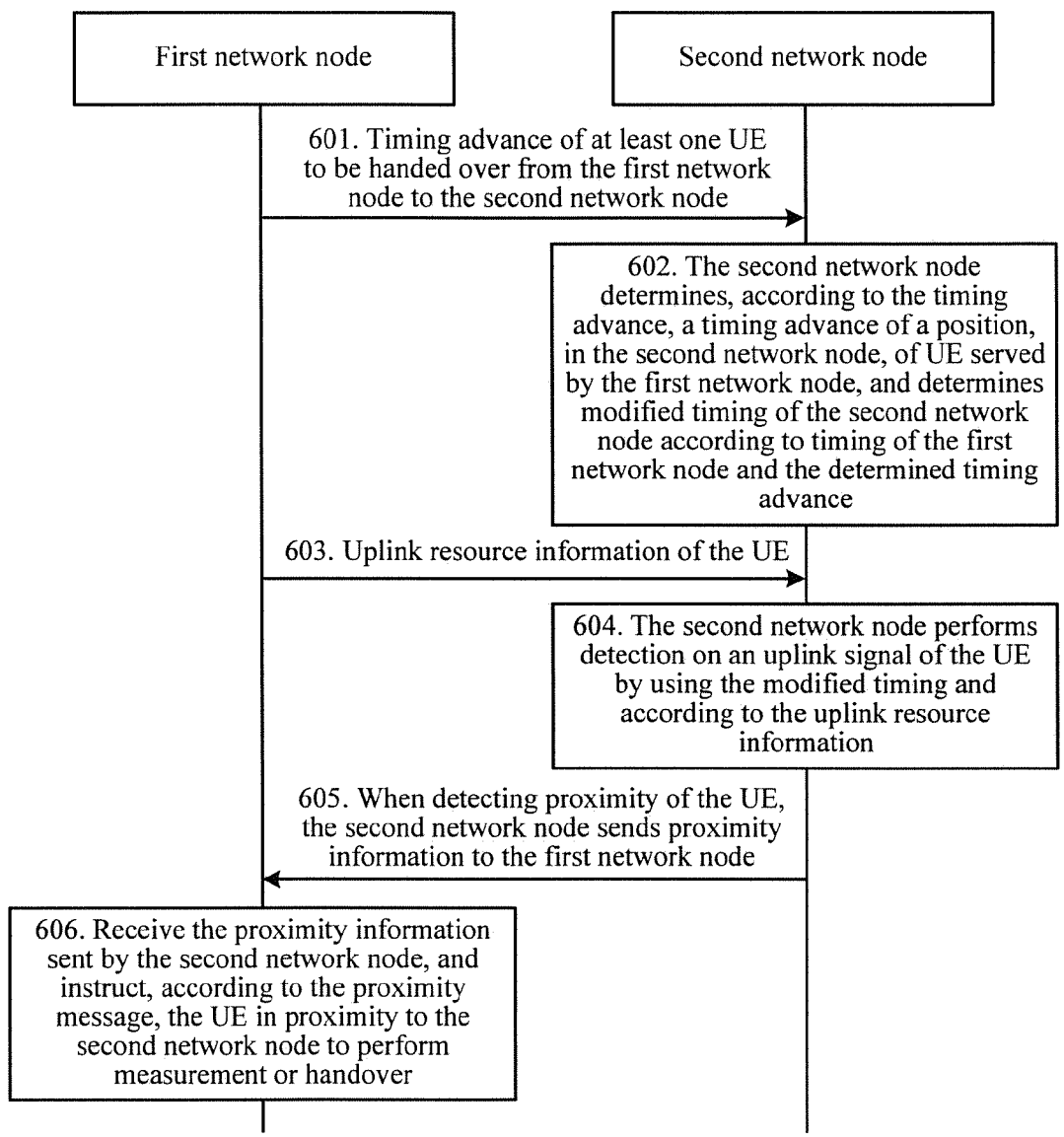
FIG. 6 is a signaling flowchart of Embodiment 5 of a cell discovery method according to the present invention.

FIG. 6 is a signaling flowchart of Embodiment 5 of a cell discovery method according to the present invention. This embodiment is implemented by a first network node and a second network node in a cooperative manner. As shown in FIG. 6, the cell discovery method provided in this embodiment includes:

601: A first network node sends, to a second network node, a timing advance of at least one UE handed over from the first network node to the second network node.

602: The second network node receives the timing advance, sent by the first network node, of the at least one UE handed over from the first network node to the second network node, and the second network node determines, according to the timing advance, a timing advance of a position, in the second network node, of UE served by the first network node, and determines modified timing of the second network node according to timing of the first network node and the determined timing advance.

603: The first network node sends uplink resource information of the UE to the second network node.

604: The second network node receives the uplink resource information of the UE sent by the first network node, and the second network node performs detection on an uplink signal of the UE by using the modified timing and according to the uplink resource information.

605: When detecting proximity of the UE, the second network node sends proximity information to the first network node.

606: The first network node receives the proximity information sent by the second network node, and the first network node instructs, according to the proximity information, the UE in proximity to the second network node to perform measurement or handover.

Specifically, the timing advance of the UE handed over from the first network node to the second network node refers to a timing advance of UE, served by the first network node, that is determined by the first network node, according to a measurement result or configuration, to satisfy a handover condition and to be allowed to request to be handed over to the second network node. In practice, the timing advance of the UE handed over from the first network node to the second network node may be carried in a handover request message that is sent by the first network node to UE, to be handed over, of the second network node, or may be separately sent. The second network node receives the timing advance, sent by the first network node, of the UE handed over from the first network node to the second network node, collects the timing advance of each UE handed over from the first network node to the second network node within a valid time segment, and determines, according to the timing advance, a timing advance of a position, in the second network node, of the UE served by the first network node.

For example, a method for determining, according to the timing advance, the timing advance of the position, in the second network node, of the UE served by the first network node may be using a maximum value of the timing advance as the timing advance of the position, in the second network node, of the UE served by the first network node, or using an average value of the timing advance as the timing advance of the position, in the second network node, of the UE served by the first network node. However, the present invention is not limited thereto, and any method of performing a mathematical operation on the timing advance to determine the timing advance of the position, in the second network node, of the UE served by the first network node is within the protection scope of the present invention.

By means of the cell discovery method provided in this embodiment of the present invention, timing of a second network node is modified by using an acquired timing advance of UE handed over from a first network node to the second network node, and a synchronization relationship based on timing modification information is established between the timing of the second network node and timing of a first network node. The second network node can detect UE served by the first network node only when the UE is in proximity to the second network node, and send proximity information to the first network node, thereby preventing the UE from performing unnecessary cell measurement or handover, reducing network signaling load, and lowering power consumption of the UE.

Figure 7:
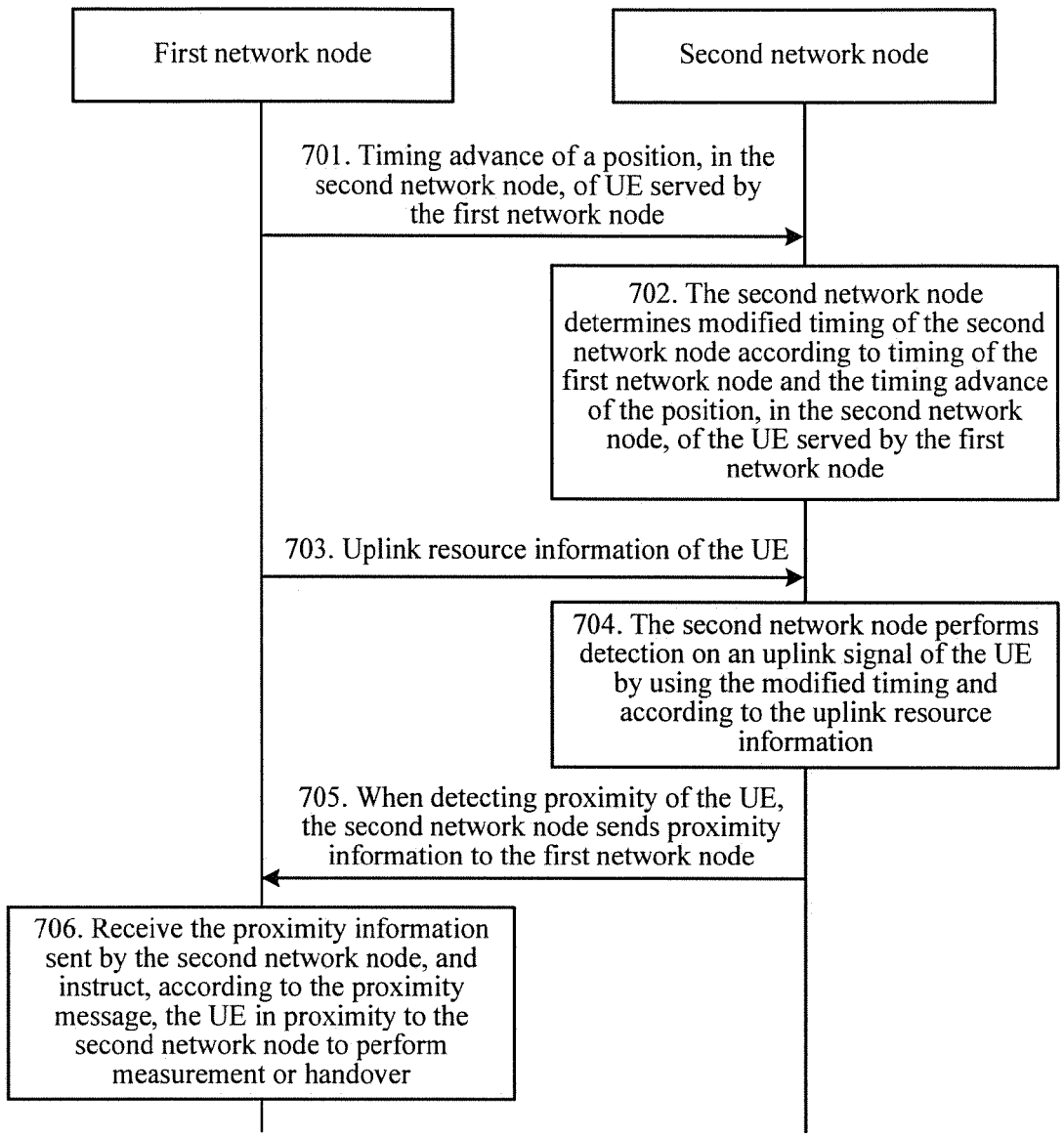
FIG. 7 is a signaling flowchart of Embodiment 6 of a cell discovery method according to the present invention.

FIG. 7 is a signaling flowchart of Embodiment 6 of a cell discovery method according to the present invention. This embodiment is implemented by a first network node and a second network node in a cooperative manner, where the second network node further has, in addition to an uplink receiving function for receiving an uplink signal of a frequency of the first network node, a function of corresponding UE; for example, the second network node can send an uplink signal at the frequency of the first network node. As shown in FIG. 7, the cell discovery method provided in this embodiment includes:

701: A first network node sends, to a second network node, a timing advance of a position, in the second network node, of UE served by the first network node.

702: The second network node receives the timing advance that is sent by the first network node and that is of the position, in the second network node, of the UE served by the first network node, and the second network node determines modified timing of the second network node according to timing of the first network node and the timing advance of the position, in the second network node, of the UE served by the first network node.

703: The first network node sends uplink resource information of the UE to the second network node.

704: The second network node receives the uplink resource information of the UE sent by the first network node, and the second network node performs detection on an uplink signal of the UE by using the modified timing and according to the uplink resource information.

705: When detecting proximity of the UE, the second network node sends proximity information to the first network node.

706: The first network node receives the proximity information sent by the second network node, and the first network node instructs, according to the proximity information, the UE in proximity to the second network node to perform measurement or handover.

Specifically, the second network node obtains, from the first network node by using a function of the UE, the timing advance of the position, in the second network node, of the UE served by the first network node. In practice, an optional manner is: The second network node may reuse an existing wireless connection establishment procedure or uplink synchronization procedure; and by sending RA Preamble, the second network node triggers the first network node to send the timing advance to the second network node; for example, the timing advance is carried in a random access response message or a timing advance command. Another optional manner is: The second network node sends, to the first network node, a new message used for triggering the first network node to send the timing advance to the second network node.

By means of the cell discovery method provided in this embodiment of the present invention, timing of a second network node is modified by using an acquired timing advance of a position, in the second network node, of UE served by a first network node, and a synchronization relationship based on timing modification information is established between the timing of the second network node and timing of a first network node. The second network node can detect UE served by the first network node only when the UE is in proximity to the second network node, and send proximity information to the first network node, thereby preventing the UE from performing unnecessary cell measurement or handover, reducing network signaling load, and lowering power consumption of the UE.

On the basis of the foregoing embodiment, before the determining, by a second network node, modified timing of the second network node according to acquired timing modification information, the second network node receives the timing of the first network node sent by the first network node. Optionally, the timing of the first network node may be a deviation between the timing of the first network node and the timing of the second network node or an absolute value of the timing of the first network node.

Figure 8:
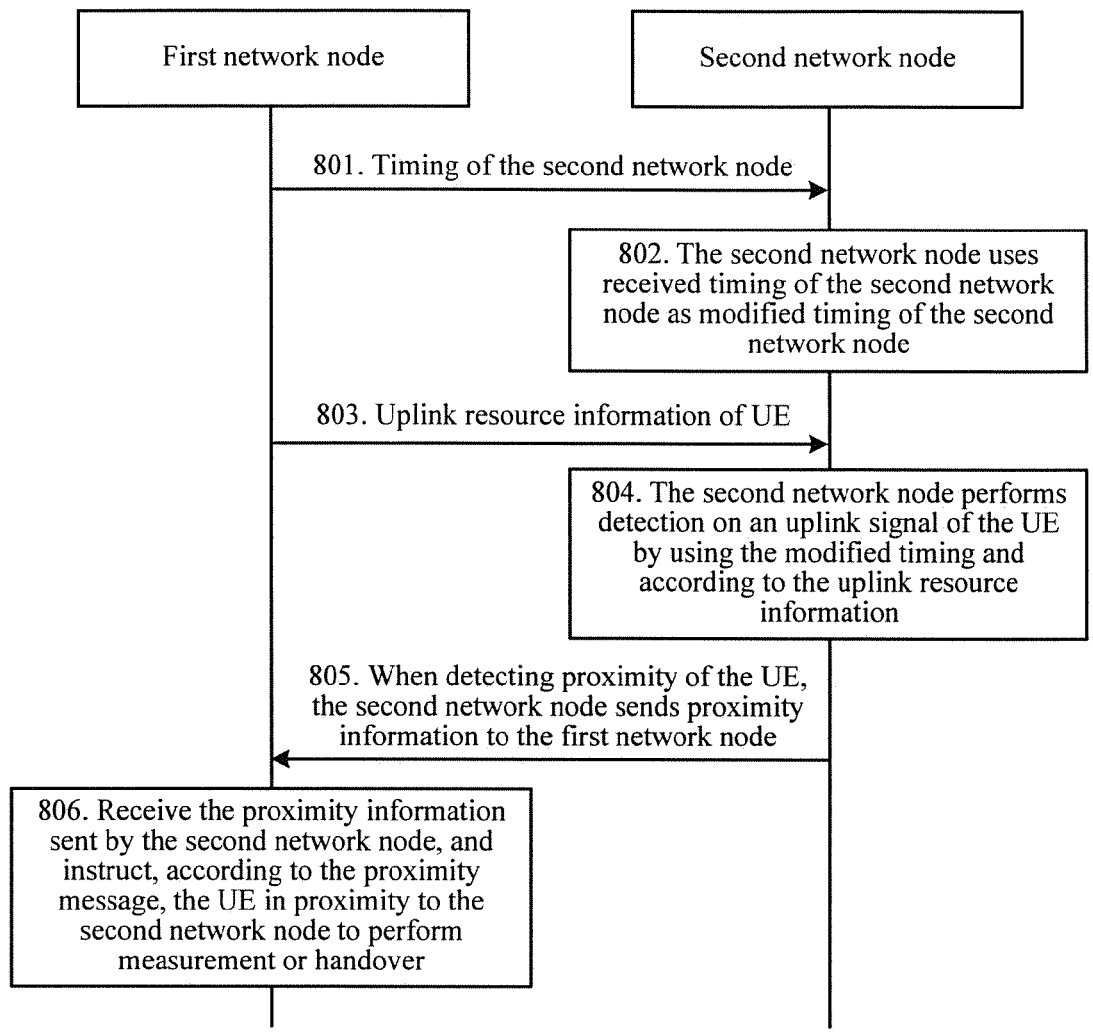
FIG. 8 is a signaling flowchart of Embodiment 7 of a cell discovery method according to the present invention.

FIG. 8 is a signaling flowchart of Embodiment 7 of a cell discovery method according to the present invention. This embodiment is implemented by a first network node and a second network node in a cooperative manner. As shown in FIG. 8, the cell discovery method provided in this embodiment includes:

801: A first network node sends timing of a second network node to the second network node.

802: The second network node receives the timing of the second network node sent by the first network node, and the second network node uses the received timing of the second network node as modified timing of the second network node.

803: The first network node sends uplink resource information of UE to the second network node.

804: The second network node receives the uplink resource information of the UE sent by the first network node, and the second network node performs detection on an uplink signal of the UE by using the modified timing and according to the uplink resource information.

805: When detecting proximity of the UE, the second network node sends proximity information to the first network node.

806: The first network node receives the proximity information sent by the second network node, and the first network node instructs, according to the proximity information, the UE in proximity to the second network node to perform measurement or handover.

Specifically, the timing modification information sent by the first network node to the second network node is the timing of the second network node; or, the timing modification information sent by the first network node to the second network node includes: timing of the first network node, and a deviation between the timing of the first network node and the timing of the second network node. After receiving the timing modification information, the second network node performs calculation of subtracting the deviation between the timing of the first network node and the timing of the second network node from the timing of the first network node, and uses an obtained difference as the modified timing.

By means of the cell discovery method provided in this embodiment of the present invention, acquired timing of a second network node is used as modified timing of the second network node, and then a synchronization relationship based on timing modification information is established between the timing of the second network node and timing of a first network node. The second network node can detect UE served by the first network node only when the UE is in proximity to the second network node, and send proximity information to the first network node, thereby preventing the UE from performing unnecessary cell measurement or handover, reducing network signaling load, and lowering power consumption of the UE.

On the basis of the foregoing embodiment, the uplink resource information of the UE that is sent by the first network node and that is received by the second network node may be all uplink resources information allocated by the first network node to the UE, or may be some of the uplink resource information allocated by the first network node to the UE. The some of the uplink resource information allocated by the first network node to the UE refers to that the first network node reserves some uplink resources for the UE, and sends information about the reserved uplink resources to the second network node, so that the second network node performs detection on an uplink signal of the user equipment by using the modified timing and according to the information about the reserved uplink resources. The first network node reserves the some uplink resources for the UE, and for example, the some uplink resources may be only information about a resource for sending signaling by the UE, but do not need to include information about a resource for sending data or performing measurement by the UE, as long as it can be ensured that the second network node can implement a function of detecting whether the UE is in proximity. For example, the information about the reserved uplink resources may be information such as a C-RNTI, an SRS, and a RA preamble, and at least one of the following features of these uplink resources is static or semi-static: a set power control parameter value, a position of a physical resource block (PRB), a quantity of PRBs, a transmission interval, a sending start position. The information about the reserved uplink resources may be used by the second network node to listen to whether the UE of the first network node is in proximity, thereby reducing signaling processing load of the second network node. The UE may select the reservation operation and inform a base station of the reservation operation, or a base station may configure the reservation operation for the UE. In this way, the UE has resources of two types of uplink signals. The SRS is used as an example: One type of SRS is used for uplink scheduling, and a power control mechanism in the prior art continues to be used as that of this type of SRS. The other type of SRS is used by the second network node to listen to whether the UE of the first network node is in proximity.

In practice, the uplink resource information of the UE served by the first network node sent by the first network node to the second network node may include: a transmit power value of the UE. The second network node performs detection on the uplink signal of the UE by using the modified timing and according to the uplink resource information. When the second network node detects the uplink signal of the UE, and detects that a difference between the transmit power value of the UE and a power value of the uplink signal is less than a preset threshold, the second network node determines that the UE is already in proximity to the second network node and that the power value of the uplink signal of the UE is large enough. That is, based on that the second network node uses the modified timing, a distance between the UE and the second network node is further determined herein by using a difference between the transmit power value of the UE and the power value of the uplink signal of the UE received by the second network node, and therefore it is determined whether the UE is in proximity to the second network node. The second network node sends the proximity information to the first network node only when UE served by the first network node is in proximity to the second network node, thereby preventing the UE from performing unnecessary cell measurement or handover, reducing network signaling load, and lowering power consumption of the UE.

Figure 9:
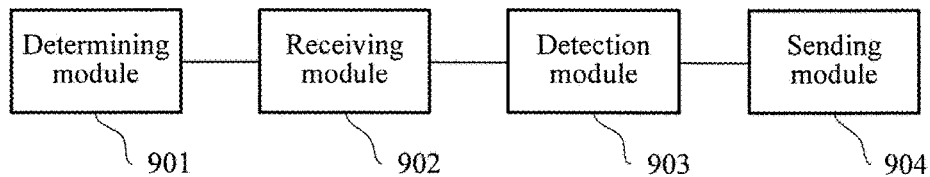
FIG. 9 is a schematic structural diagram of Embodiment 1 of a second network node according to the present invention.

FIG. 9 is a schematic structural diagram of Embodiment 1 of a second network node according to the present invention. As shown in FIG. 9, a second network node 900 provided in this embodiment includes: a determining module 901, a receiving module 902, a detection module 903, and a sending module 904, where:

the determining module 901 is configured to determine modified timing of the second network node according to acquired timing modification information;

the receiving module 902 is configured to receive uplink resource information of user equipment sent by a first network node;

the detection module 903 is configured to perform detection on an uplink signal of the user equipment by using the modified timing determined by the determining module 901 and according to the uplink resource information received by the receiving module 902; and the sending module 904 is configured to: when the detection module 903 detects proximity of the user equipment, send proximity information to the first network node.

The cell discovery apparatus provided in this embodiment of the present invention may be configured to execute the technical solution in the embodiment of the cell discovery method shown in FIG. 1. An implementation principle and a technical effect of the apparatus are similar, and are not described in detail again herein.

Optionally, the receiving module 902 is further configured to: before the determining module 901 determines the modified timing of the second network node according to the acquired timing modification information, receive the timing modification information sent by the first network node or a network administration and maintenance entity.

Optionally, the timing modification information includes: a distance value between the second network node and the first network node; and the determining module 901 is specifically configured to determine, according to the distance value, a timing advance of a position, in the second network node, of the user equipment served by the first network node; and determine the modified timing according to timing of the first network node and the timing advance.

Optionally, the timing modification information includes: a timing advance of at least one user equipment handed over from the first network node to the second network node; and the determining module 901 is specifically configured to determine, according to the timing advance, a timing advance of a position, in the second network node, of the user equipment served by the first network node; and determine the modified timing according to timing of the first network node and the determined timing advance.

Optionally, the determining module 901 is specifically configured to use a maximum value of the timing advance as the timing advance of the position, in the second network node, of the user equipment served by the first network node; or, use an average value of the timing advance as the timing advance of the position, in the second network node, of the user equipment served by the first network node.

Optionally, the timing modification information includes: a timing advance of a position, in the second network node, of the user equipment served by the first network node; and the determining module 901 is specifically configured to determine the modified timing according to timing of the first network node and the timing advance of the position, in the second network node, of the user equipment served by the first network node.

Optionally, the receiving module 902 is further configured to: before the determining module 901 determines the modified timing of the second network node according to the acquired timing modification information, receive the timing of the first network node sent by the first network node.

Optionally, the timing modification information includes: timing of the second network node; and the determining module 901 is specifically configured to use received timing of the second network node as the modified timing.

Optionally, the sending module 904 is further configured to: before the receiving module 902 receives the timing modification information sent by the first network node or the network administration and maintenance entity, send a timing modification request message to the first network node or the network administration and maintenance entity; and/or, the sending module 904 is further configured to: before the receiving module 902 receives the uplink resource information of the user equipment sent by the first network node, send an acquisition request message for the uplink resource information of the user equipment to the first network node.

Optionally, the uplink resource information includes: a transmit power value of the user equipment; and the sending module 904 is specifically configured to: when the detection module 903 detects the uplink signal of the user equipment, and detects that a difference between the transmit power value of the user equipment and a power value of the uplink signal is less than a preset threshold, send the proximity information to the first network node.

Optionally, the uplink resource information is information about an uplink resource reserved by the first network node for the user equipment, and at least one feature of the uplink resource is static or semi-static.

Optionally, the proximity information includes a user identifier of the user equipment or resource information used by the user equipment.

Figure 10:
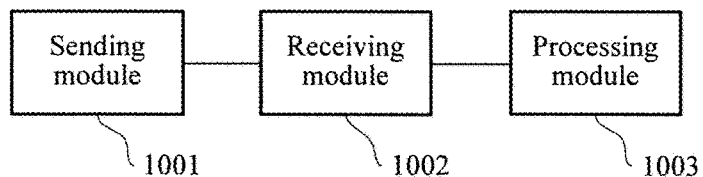
FIG. 10 is a schematic structural diagram of Embodiment 1 of a first network node according to the present invention.

FIG. 10 is a schematic structural diagram of Embodiment 1 of a first network node according to the present invention. As shown in FIG. 10, a first network node 1000 provided in this embodiment includes: a sending module 1001, a receiving module 1002, and a processing module 1003, where:

the sending module 1001 is configured to send timing modification information to a second network node, where the timing modification information is used by the second network node to determine modified timing of the second network node according to the timing modification information;

the sending module 1001 is further configured to send uplink resource information of user equipment to the second network node;

the receiving module 1002 is configured to receive proximity information sent by the second network node, where the proximity information is obtained, by the second network node by performing detection on an uplink signal of the user equipment by using the modified timing and according to the uplink resource information, when the second network node detects proximity of the user equipment; and the processing module 1003 is configured to instruct, according to the proximity information sent by the second network node and received by the receiving module 1002, the user equipment in proximity to the second network node to perform measurement or handover.

The cell discovery apparatus provided in this embodiment of the present invention may be configured to execute the technical solution in the embodiment of the cell discovery method shown in FIG. 3. An implementation principle and a technical effect of the apparatus are similar, and are not described in detail again herein.

Optionally, the timing modification information includes at least one of the following information:

a distance value between the second network node and the first network node;

a timing advance of at least one user equipment handed over from the first network node to the second network node;

a timing advance of a position, in the second network node, of the user equipment served by the first network node; and timing of the second network node.

Optionally, the receiving module 1002 is further configured to: before the sending module 1001 sends the timing modification information to the second network node, receive a timing modification request message sent by the second network node;

and/or, the receiving module 1002 is further configured to: before the sending module 1001 sends the uplink resource information of the user equipment to the second network node, receive an acquisition request message, sent by the second network node, for the uplink resource information of the user equipment.

Optionally, the uplink resource information includes a transmit power value of the user equipment.

Optionally, the uplink resource information is information about an uplink resource reserved by the first network node for the user equipment, and at least one feature of the uplink resource is static or semi-static.

Optionally, the proximity information includes a user identifier of the user equipment or resource information used by the user equipment.

Figure 11:
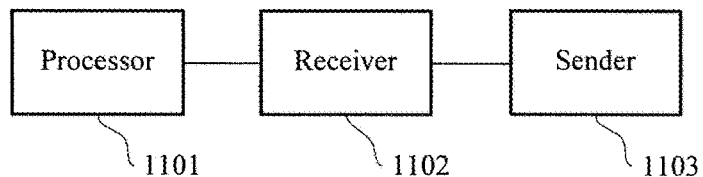
FIG. 11 is a schematic structural diagram of Embodiment 2 of a second network node according to the present invention.

FIG. 11 is a schematic structural diagram of Embodiment 2 of a second network node according to the present invention. As shown in FIG. 11, a second network node 1100 provided in this embodiment includes: a processor 1101, a receiver 1102, and a sender 1103, where:

the processor 1101 is configured to determine modified timing of the second network node according to acquired timing modification information;

the receiver 1102 is configured to receive uplink resource information of user equipment sent by a first network node;

the processor 1101 is further configured to perform detection on an uplink signal of the user equipment by using the modified timing and according to the uplink resource information received by the receiver 1102; and the sender 1103 is configured to: when the processor 1101 detects proximity of the user equipment, send proximity information to the first network node.

The cell discovery apparatus provided in this embodiment of the present invention may be configured to execute the technical solution in the embodiment of the cell discovery method shown in FIG. 1. An implementation principle and a technical effect of the apparatus are similar, and are not described in detail again herein.

Optionally, the receiver 1102 is further configured to: before the processor 1101 determines the modified timing of the second network node according to the acquired timing modification information, receive the timing modification information sent by the first network node or a network administration and maintenance entity.

Optionally, the timing modification information includes: a distance value between the second network node and the first network node; and the processor 1101 is specifically configured to determine, according to the distance value, a timing advance of a position, in the second network node, of the user equipment served by the first network node; and determine the modified timing according to timing of the first network node and the timing advance.

Optionally, the timing modification information includes: a timing advance of at least one user equipment handed over from the first network node to the second network node; and the processor 1101 is specifically configured to determine, according to the timing advance, a timing advance of a position, in the second network node, of the user equipment served by the first network node; and determine the modified timing according to timing of the first network node and the determined timing advance.

Optionally, the processor 1101 is specifically configured to use a maximum value of the timing advance as the timing advance of the position, in the second network node, of the user equipment served by the first network node; or, use an average value of the timing advance as the timing advance of the position, in the second network node, of the user equipment served by the first network node.

Optionally, the timing modification information includes: a timing advance of a position, in the second network node, of the user equipment served by the first network node; and the processor 1101 is specifically configured to determine the modified timing according to timing of the first network node and the timing advance of the position, in the second network node, of the user equipment served by the first network node.

Optionally, the receiver 1102 is further configured to: before the processor 1101 determines the modified timing of the second network node according to the acquired timing modification information, receive the timing of the first network node sent by the first network node.

Optionally, the timing modification information includes: timing of the second network node; and the processor 1101 is specifically configured to use received timing of the second network node as the modified timing.

Optionally, the sender 1103 is further configured to: before the receiver 1102 receives the timing modification information sent by the first network node or the network administration and maintenance entity, send a timing modification request message to the first network node or the network administration and maintenance entity;

and/or, the sender 1103 is further configured to: before the receiver 1102 receives the uplink resource information of the user equipment sent by the first network node, send an acquisition request message for the uplink resource information of the user equipment to the first network node.

Optionally, the uplink resource information includes: a transmit power value of the user equipment; and the sender 1103 is specifically configured to: when the processor 1101 detects the uplink signal of the user equipment, and detects that a difference between the transmit power value of the user equipment and a power value of the uplink signal is less than a preset threshold, send the proximity information to the first network node.

Optionally, the uplink resource information is information about an uplink resource reserved by the first network node for the user equipment, and at least one feature of the uplink resource is static or semi-static.

Optionally, the proximity information includes a user identifier of the user equipment or resource information used by the user equipment.

Figure 12:
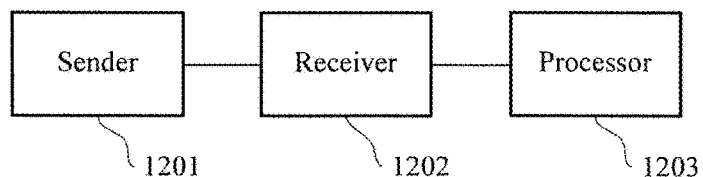
FIG. 12 is a schematic structural diagram of Embodiment 2 of a first network node according to the present invention.

FIG. 12 is a schematic structural diagram of Embodiment 2 of a first network node according to the present invention. As shown in FIG. 12, a first network node 1200 provided in this embodiment includes: a sender 1201, a receiver 1202, and a processor 1203, where:

the sender 1201 is configured to send timing modification information to a second network node, where the timing modification information is used by the second network node to determine modified timing of the second network node according to the timing modification information;

the sender 1201 is further configured to send uplink resource information of user equipment to the second network node;

the receiver 1202 is configured to receive proximity information sent by the second network node, where the proximity information is obtained, by the second network node by performing detection on an uplink signal of the user equipment by using the modified timing and according to the uplink resource information, when the second network node detects proximity of the user equipment; and the processor 1203 is configured to instruct, according to the proximity information sent by the second network node and received by the receiver 1202, the user equipment in proximity to the second network node to perform measurement or handover.

The cell discovery apparatus provided in this embodiment of the present invention may be configured to execute the technical solution in the embodiment of the cell discovery method shown in FIG. 3. An implementation principle and a technical effect of the apparatus are similar, and are not described in detail again herein.

Optionally, the timing modification information includes at least one of the following information:

a distance value between the second network node and the first network node;

a timing advance of at least one user equipment handed over from the first network node to the second network node;

a timing advance of a position, in the second network node, of the user equipment served by the first network node; and timing of the second network node.

Optionally, the receiver 1202 is further configured to: before the sender 1201 sends the timing modification information to the second network node, receive a timing modification request message sent by the second network node; and/or, the receiver 1202 is further configured to: before the sender 1201 sends the uplink resource information of the user equipment to the second network node, receive an acquisition request message that is sent by the second network node for the uplink resource information of the user equipment.

Optionally, the uplink resource information includes: a transmit power value of the user equipment.

Optionally, the uplink resource information is information about an uplink resource reserved by the first network node for the user equipment, and at least one feature of the uplink resource is static or semi-static.

Optionally, the proximity information includes a user identifier of the user equipment or resource information used by the user equipment.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A cell discovery method, comprising:

determining, by a second network node, modified timing of the second network node according to acquired timing modification information, wherein the modified timing of the second network node is based at least in part on a cyclic prefix length value of a position of a user equipment (UE);

receiving, by the second network node, uplink resource information of user equipment sent by a first network node;

performing, by the second network node, detection on an uplink signal of the user equipment by using the modified timing and according to the uplink resource information; and when detecting proximity of the user equipment according to a transmit power value of the UE and a power value of the uplink signal, sending, by the second network node, proximity information to the first network node.

2. The method according to claim 1, wherein before determining, by a second network node, modified timing of the second network node according to acquired timing modification information, the method further comprises:

receiving, by the second network node, the timing modification information sent by the first network node or a network administration and maintenance entity.

3. The method according to claim 2, wherein:

the timing modification information comprises: a distance value between the second network node and the first network node; and determining, by a second network node, modified timing of the second network node according to acquired timing modification information comprises:

determining, by the second network node according to the distance value, a timing advance of a position, in the second network node, of the user equipment served by the first network node, and determining, by the second network node, the modified timing according to timing of the first network node and the timing advance.

4. The method according to claim 3, wherein before determining, by a second network node, modified timing of the second network node according to acquired timing modification information, the method further comprises:

receiving, by the second network node, the timing of the first network node sent by the first network node.

5. The method according to claim 2, wherein:

the timing modification information comprises: a timing advance of at least one user equipment handed over from the first network node to the second network node; and determining, by a second network node, modified timing of the second network node according to acquired timing modification information comprises:

determining, by the second network node according to the timing advance, a timing advance of a position, in the second network node, of the user equipment served by the first network node, and determining, by the second network node, the modified timing according to timing of the first network node and the determined timing advance.

6. The method according to claim 2, wherein:
the timing modification information comprises: timing of the second network node; and
determining, by a second network node, modified timing of the second network node according to acquired timing modification information comprises:
  using, by the second network node, received timing of the second network node as the modified timing.

7. The method according to claim 2, wherein:
before receiving, by the second network node, the timing modification information sent by the first network node or a network administration and maintenance entity, the method further comprises:
  sending, by the second network node, a timing modification request message to the first network node or the network administration and maintenance entity; and/or
before receiving, by the second network node, uplink resource information of user equipment sent by a first network node, the method further comprises:
  sending, by the second network node, an acquisition request message for the uplink resource information of the user equipment to the first network node.

8. A cell discovery method, comprising:
sending, by a first network node, timing modification information to a second network node, wherein the timing modification information is used by the second network node to determine modified timing of the second network node according to the timing modification information, wherein the modified timing of the second network node is based at least in part on a cyclic prefix length value of a position of a user equipment (UE);
sending, by the first network node, uplink resource information of user equipment to the second network node;
receiving, by the first network node, proximity information sent by the second network node, wherein the proximity information is obtained by the second network node by performing detection on an uplink signal of the user equipment by using the modified timing and according to the uplink resource information, when the second network node detects proximity of the user equipment according to a transmit power value of the UE and a power value of the uplink signal; and
instructing, by the first network node according to the proximity information, the user equipment in proximity to the second network node to perform measurement or handover.

9. The method according to claim 8, wherein the timing modification information comprises at least one of the following information:
a distance value between the second network node and the first network node;
a timing advance of at least one user equipment handed over from the first network node to the second network node;
a timing advance of a position, in the second network node, of the user equipment served by the first network node; and
timing of the second network node.

10. The method according to claim 8, wherein:
before sending, by a first network node, timing modification information to a second network node, the method further comprises:
  receiving, by the first network node, a timing modification request message sent by the second network node; and/or
before sending, by the first network node, uplink resource information of user equipment to the second network node, the method further comprises:
  receiving, by the first network node, an acquisition request message, sent by the second network node, for the uplink resource information of the user equipment.

11. A second network node, comprising:
a processor, configured to determine modified timing of the second network node according to acquired timing modification information, wherein the modified timing of the second network node is based at least in part on a cyclic prefix length value of a position of a user equipment (UE);
a receiver, configured to receive uplink resource information of user equipment sent by a first network node;
wherein the processor is further configured to perform detection on an uplink signal of the user equipment by using the modified timing and according to the uplink resource information received by the receiver; and
a sender, configured to: when the processor detects proximity of the user equipment according to a transmit power value of the UE and a power value of the uplink signal, send proximity information to the first network node.

12. The second network node according to claim 11, wherein the receiver is further configured to:
before the processor determines the modified timing of the second network node according to the acquired timing modification information, receive the timing modification information sent by the first network node or a network administration and maintenance entity.

13. The second network node according to claim 12, wherein:
the timing modification information comprises: a distance value between the second network node and the first network node; and
the processor is configured to:
  determine, according to the distance value, a timing advance of a position, in the second network node, of the user equipment served by the first network node, and
  determine the modified timing according to timing of the first network node and the timing advance.

14. The second network node according to claim 13, wherein the receiver is further configured to:
before the processor determines the modified timing of the second network node according to the acquired timing modification information, receive the timing of the first network node sent by the first network node.

15. The second network node according to claim 12, wherein:
the timing modification information comprises: a timing advance of at least one user equipment handed over from the first network node to the second network node; and
the processor is configured to:
  determine, according to the timing advance, a timing advance of a position, in the second network node, of the user equipment served by the first network node, and
  determine the modified timing according to timing of the first network node and the determined timing advance.

16. The second network node according to claim 12, wherein:

the timing modification information comprises: timing of
the second network node; and the processor is configured to use received timing of the
second network node as the modified timing.

17. The second network node according to claim 12, wherein:
the sender is further configured to: before the receiver
receives the timing modification information sent by
the first network node or the network administration
and maintenance entity, send a timing modification
request message to the first network node or the network administration and maintenance entity; and/or the sender is further configured to: before the receiver
receives the uplink resource information of the user
equipment sent by the first network node, send an
acquisition request message for the uplink resource
information of the user equipment to the first network
node.

18. A first network node, comprising:
a sender, configured to:
send timing modification information to a second network node, wherein the timing modification information is used by the second network node to
determine modified timing of the second network
node according to the timing modification information, and the modified timing of the second network
node is based at least in part on a cyclic prefix length
value of a position of a user equipment (UE) and
send uplink resource information of user equipment to
the second network node;

a receiver, configured to receive proximity information
sent by the second network node, wherein the proximity information is obtained by the second network node
by performing detection on an uplink signal of the user
equipment by using the modified timing and according
to the uplink resource information and when the second
network node detects proximity of the user equipment
according to a transmit power value of the UE and a
power value of the uplink signal; and a processor, configured to instruct, according to the proximity information sent by the second network node and
received by the receiver, the user equipment in proximity to the second network node to perform measurement or handover.

19. The first network node according to claim 18, wherein
the timing modification information comprises at least one
of the following information:

a distance value between the second network node and the
first network node;

a timing advance of at least one user equipment handed
over from the first network node to the second network
node;

a timing advance of a position, in the second network
node, of the user equipment served by the first network
node; and timing of the second network node.

20. The first network node according to claim 18, wherein:
the receiver is further configured to: before the sender
sends the timing modification information to the second network node, receive a timing modification
request message sent by the second network node;
and/or the receiver is further configured to: before the sender
sends the uplink resource information of the user
equipment to the second network node, receive an
acquisition request message, sent by the second network node, for the uplink resource information of the
user equipment.

* * * * *